(12) United States Patent
Roessinger et al.

(10) Patent No.: US 12,546,373 B2
(45) Date of Patent: Feb. 10, 2026

(54) BRAKE PAD ARRANGEMENT FOR A DISC BRAKE OF A VEHICLE BRAKING SYSTEM

(71) Applicant: ZF Active Safety GmbH, Koblenz (DE)

(72) Inventors: Florian Roessinger, Neuwied (DE); Peter Mäurer, Koblenz (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 568 days.

(21) Appl. No.: 17/046,874

(22) PCT Filed: Mar. 18, 2019

(86) PCT No.: PCT/EP2019/056692
§ 371 (c)(1),
(2) Date: Oct. 12, 2020

(87) PCT Pub. No.: WO2019/197115
PCT Pub. Date: Oct. 17, 2019

(65) Prior Publication Data
US 2021/0180658 A1    Jun. 17, 2021

(30) Foreign Application Priority Data
Apr. 10, 2018  (DE) .......................... 102018002886.1

(51) Int. Cl.
*F16D 65/097*    (2006.01)
*F16D 65/12*     (2006.01)
*F16D 55/00*     (2006.01)

(52) U.S. Cl.
CPC ....... *F16D 65/0978* (2013.01); *F16D 65/122* (2013.01); *F16D 2055/0016* (2013.01)

(58) Field of Classification Search
CPC ............. F16D 65/0977; F16D 65/0972; F16D 65/0978; F16D 55/227; F16D 65/0979;
(Continued)

(56) References Cited

U.S. PATENT DOCUMENTS 3,294,205 A * 12/1966 Schanz ............... F16D 65/0977
                                                   188/205 A
3,322,236 A *  5/1967 Burnett ............... F16D 55/2255
                                                    188/73.35
(Continued)

FOREIGN PATENT DOCUMENTS

DE    2225178 A1   1/1974
DE    3130185 A1   4/1982
(Continued)

OTHER PUBLICATIONS

DE 102017001089 A1 (Year: 2018).*
(Continued)

*Primary Examiner* — Robert A. Siconolfi
*Assistant Examiner* — Mahbubur Rashid
(74) *Attorney, Agent, or Firm* — Tarolli, Sundheim, Covell & Tummino LLP

(57) ABSTRACT

A brake pad arrangement for a disc brake of a vehicle braking system includes at least one brake pad carrier plate and at least one friction lining is attached to the at least one brake pad carrier plate, wherein the brake pad carrier plate has at least one fastening section which is configured for fastening the brake pad restoring device, wherein the fastening section has at least one bearing surface for the brake pad restoring device, wherein the at least one bearing surface extends obliquely with respect to the longitudinal axis of the brake pad carrier plate.

19 Claims, 12 Drawing Sheets

(58) Field of Classification Search
CPC ........... F16D 2055/007; F16D 65/0975; F16D 65/0976; F16D 65/097; F16D 2065/1368; F16D 65/0974; F16D 65/0018; F16D 65/122; F16D 2055/0016
See application file for complete search history.

(56) References Cited

U.S. PATENT DOCUMENTS

| | | | | |
|---|---|---|---|---|
| 3,592,301 | A * | 7/1971 | Auth | F16D 65/0977 188/73.43 |
| 3,841,444 | A * | 10/1974 | Baum | F16D 55/228 188/73.38 |
| 3,893,547 | A * | 7/1975 | Schanz | F16D 65/0974 188/73.38 |
| 4,219,105 | A * | 8/1980 | Delaunay | F16D 65/0977 188/73.38 |
| 4,417,647 | A * | 11/1983 | Cotter | F16D 65/0976 188/73.38 |
| 4,441,588 | A * | 4/1984 | Saito | F16D 55/227 188/73.38 |
| 4,491,204 | A * | 1/1985 | Dirauf | F16D 65/0975 188/73.38 |
| 4,538,708 | A * | 9/1985 | Seki | F16D 55/226 188/73.38 |
| 4,632,227 | A * | 12/1986 | Mery | F16D 65/092 188/73.1 |
| 4,993,520 | A * | 2/1991 | Goddard | F16D 65/0978 188/73.1 |
| 5,467,846 | A * | 11/1995 | Abe | F16D 65/0006 188/73.37 |
| 5,947,234 | A * | 9/1999 | Shimazaki | F16D 65/0977 188/73.38 |
| 6,957,724 | B2 * | 10/2005 | Gherardi | F16D 65/0975 188/73.38 |
| 7,958,976 | B2 * | 6/2011 | Morio | F16D 65/0977 188/73.38 |
| 8,016,085 | B2 * | 9/2011 | Keller | F16D 65/0978 188/73.38 |
| 8,037,977 | B2 * | 10/2011 | Arakawa | F16D 65/0977 188/73.38 |
| 8,517,152 | B2 * | 8/2013 | Zenzen | F16D 65/0977 188/73.35 |
| 9,285,000 | B2 * | 3/2016 | Nanri | F16D 65/095 |
| 9,970,495 | B2 * | 5/2018 | Crippa | F16D 55/225 |
| 10,156,274 | B2 * | 12/2018 | Crippa | F16D 55/227 188/73.38 |
| 10,316,912 | B2 * | 6/2019 | Crippa | F16D 65/0006 |
| 2004/0262099 | A1 * | 12/2004 | Crippa | F16D 65/0977 188/73.35 |
| 2008/0006489 | A1 * | 1/2008 | Morio | F16D 65/0977 188/73.38 |
| 2012/0152664 | A1 * | 6/2012 | Crippa | F16D 65/0018 188/73.38 |
| 2016/0160946 | A1 | 6/2016 | Graaf et al. | |
| 2017/0102042 | A1 * | 4/2017 | Crippa | F16D 55/228 |

FOREIGN PATENT DOCUMENTS

| | | |
|---|---|---|
| DE | 19857559 A1 | 6/2000 |
| DE | 102008051236 A1 | 4/2010 |
| DE | 102012102584 A1 | 9/2013 |
| DE | 102012024945 A1 | 6/2014 |
| DE | 102017208575 A1 | 11/2017 |
| DE | 102016010301 A1 | 3/2018 |
| EP | 2644926 A1 | 10/2013 |
| WO | 2012111828 A1 | 8/2012 |

OTHER PUBLICATIONS

DE 102011016831 A1 (Year: 2012).*
DP 0649992 B1 (Year: 1997).*
WO 2012111828 A1 (Year: 2012).*

* cited by examiner

BRAKE PAD ARRANGEMENT FOR A DISC BRAKE OF A VEHICLE BRAKING SYSTEM

CROSS-REFERENCE TO RELATED APPLICATION

This application is a national stage of International Application No. PCT/EP2019/056692, filed Mar. 18, 2019, the disclosure of which is incorporated herein by reference in its entirety, and which claimed priority to German Patent Application No. 102018002886.1, filed Apr. 10, 2018, the disclosure of which is incorporated herein by reference in its entirety.

TECHNICAL FIELD

The present disclosure relates to a brake pad arrangement for a disc brake of a vehicle braking system. The present disclosure furthermore relates to a disc brake having a brake pad arrangement of this kind.

BACKGROUND

Brake pad arrangements are known from the prior art, e.g. from German Laid-Open Application WO 2016/141135 A1. Brake pad arrangements generally comprise a brake pad carrier plate and a friction pad attached thereto.

SUMMARY

It is an object of the present disclosure to provide a brake pad arrangement by means of which it is possible to better suppress unwanted noise during the operation of a vehicle.

According to the disclosure, this object is achieved by means of a brake pad arrangement having the features of patent claim 1. Further advantageous embodiments are specified in the dependent claims.

The brake pad arrangement according to the disclosure for a disc brake of a vehicle braking system comprises at least one brake pad carrier plate and a friction pad, which is attached to the brake pad carrier plate. The brake pad carrier plate has at least one fastening section, which is designed for fastening a brake pad return device. The fastening section has at least one bearing surface for the brake pad return device. The at least one bearing surface extends obliquely with respect to a longitudinal axis of the brake pad carrier plate. The longitudinal axis extends in the plane of the brake carrier plate in a direction which extends at a right angle to an axis of rotation of the brake disc in a projection onto the plane of the axis of rotation of the brake disc.

By means of the at least one fastening section and its at least one bearing surface extending obliquely with respect to the longitudinal axis of the brake pad carrier plate, the brake pad arrangement can be positioned in a predetermined position or a predetermined orientation in the brake caliper. In this predetermined position and/or predetermined orientation, it is possible to prevent the brake pad arrangement from striking against the brake caliper in certain operating situations of the vehicle. Moreover, it is also possible by means of a brake pad arrangement of this kind to prevent the rattling noises which occur on an uneven roadway or in the case of potholes.

The at least one bearing surface can extend at least substantially at a right angle to the face of the brake pad carrier plate to which the friction pad is attached. The at least one bearing surface can extend between the face for the friction pad and the rear face or rear side of the brake pad carrier plate. The at least one bearing surface can also extend at a right angle to the rear face of the brake pad carrier plate. The at least one bearing surface can form a contoured edge of the brake pad carrier plate. The at least one bearing surface can adjoin a contoured edge of the brake pad carrier plate or, alternatively, can form just one section of a contoured edge of the brake pad carrier plate.

The at least one bearing surface can extend at a predetermined angle obliquely to the longitudinal axis of the brake pad carrier plate. The predetermined angle can be an acute angle. The predetermined angle can be between 10° and 80°. The predetermined angle can preferably be between 15° and 45°. In particular, the predetermined angle can be 30°. The specified angle values can refer to the smallest angle which the at least one bearing surface encloses with the longitudinal axis of the brake pad carrier plate.

The brake pad carrier plate can have a first fastening section and a second fastening section. The first fastening section and the second fastening section can each have a bearing surface which extends obliquely with respect to the longitudinal axis of the brake pad carrier plate. The two fastening sections can be formed on the brake pad carrier plate in a manner offset with respect to one another along the longitudinal axis of the brake pad carrier plate. Each of the bearing surfaces can extend at a predetermined angle obliquely to the longitudinal axis of the brake pad carrier plate. The absolute value of the two angles can be the same or different.

The bearing surface of the first fastening section and the bearing surface of the second fastening section can extend substantially parallel to one another. The bearing surfaces of the two fastening sections can thus extend parallel to one another and in each case obliquely with respect to the longitudinal axis of the brake pad carrier plate.

The bearing surface of the first fastening section and the bearing surface of the second fastening section can slope in opposite directions. In other words, the openings of the two angles may face one another. The absolute value of the angle which the bearing surface of the first fastening section encloses with the longitudinal axis of the brake pad carrier plate, and the absolute value of the angle which the bearing surface of the second fastening section encloses with the longitudinal axis of the brake pad carrier plate can be the same.

The brake pad carrier plate can have at least one oblong opening, which is designed to receive a holding element for the brake pad arrangement. The at least one holding element can be a holding bolt or a holding pin, for example. The at least one holding element can extend through the at least one oblong opening. The oblong opening can be of substantially rectangular design. The rectangular shape of the oblong opening can have rounded corners. The at least one oblong opening can be associated with the at least one fastening section. The at least one oblong opening can extend between the bearing surface of the fastening section associated with the oblong opening and the at least one friction pad in a direction transverse to the longitudinal axis. The at least one oblong opening can have at least one edge, the length of which defines the maximum extent of the oblong opening. The at least one oblong opening preferably has at least two edges which extend substantially parallel to one another and the length of which defines the maximum extent of the oblong opening. The two edges extending at least substantially parallel to one another are preferably of equal size.

The at least one oblong opening can extend at least substantially parallel to the longitudinal axis of the brake pad carrier plate. In this case, at least the at least one edge, the length of which defines the maximum extent of the oblong opening, can extend parallel to the longitudinal axis of the brake pad carrier plate.

Alternatively, the at least one oblong opening can extend obliquely with respect to the longitudinal axis of the brake pad carrier plate. At least the at least one edge that defines the maximum extent of the oblong opening can extend at a predetermined angle to the longitudinal axis of the brake pad carrier plate. The oblong opening preferably has two edges, the length of which defines the maximum extent of the oblong opening and which extend at the same predetermined angle to the longitudinal axis of the brake pad carrier plate. The at least one oblong opening can extend at an angle of 30° to the longitudinal axis of the brake pad carrier plate, for example. Particularly the edges, the length of which defines the maximum extent of the oblong opening, can extend at an angle of 30° to the longitudinal axis of the brake pad carrier plate.

The at least one oblong opening can extend parallel to the at least one bearing surface of the at least one fastening section. In this case, the oblong opening can extend obliquely with respect to the longitudinal axis of the brake pad carrier plate. The two at least substantially parallel edges of the oblong opening can extend parallel to the bearing surface of the at least one fastening section and obliquely with respect to the longitudinal axis of the brake pad carrier plate.

The at least one fastening section can be in the form of a projection on a contoured edge of the brake pad carrier plate. The contoured edge can extend at least substantially parallel to the longitudinal axis of the brake pad carrier plate. The at least one fastening section can project from a contoured edge of the brake pad carrier plate in a direction transverse to the longitudinal axis of the brake pad carrier plate. It can overlap at least partially with the extent of the friction pad along the longitudinal axis of the brake pad carrier plate. Thus, in a direction transverse to the longitudinal axis of the brake pad carrier plate, the at least one fastening section can be formed above the friction pad.

The present disclosure furthermore relates to a disc brake having a first brake pad arrangement and a second brake pad arrangement of the type described above and having a brake caliper. The disc brake furthermore comprises at least one holding element, on which the first brake pad arrangement and the second brake pad arrangement are suspended, and at least one brake pad return device, wherein the at least one brake pad return device is attached to the at least one holding element and in each case to a fastening section of the first brake pad arrangement and of the second brake pad arrangement and preloads the brake pad arrangements into their initial position.

By virtue of the oblique alignment of the bearing surface on the at least one fastening section for the brake pad return device, the brake pad arrangement can be preloaded into a predetermined position and/or a predetermined orientation by means of the preloading force provided by the brake pad return device. The oblique alignment of the bearing surface leads to a division of the preloading force provided by the brake pad return device into a force component acting substantially in the direction of the longitudinal axis of the brake pad carrier plate and a force component acting transversely to the longitudinal axis of the brake pad carrier plate. In the state of the brake pad arrangement in which it is installed in the vehicle, the force component acting in the longitudinal direction of the brake pad carrier plate acts in a tangential direction with respect to the wheel axle. In the state of the brake pad arrangement in which it is installed in the vehicle, the force component acting transversely to the longitudinal axis of the brake pad carrier plate acts in a radial direction with respect to the wheel axle. By means of the force components resulting from the oblique alignment of the bearing surface of the at least one fastening section, the brake pad arrangement can be preloaded into a predetermined position and/or a predetermined orientation in the brake caliper. Depending on the slope or obliquity of the bearing surfaces, it is possible, in particular, to produce tangential force components that act in the same direction or in opposite directions. Depending on the slope or obliquity of the bearing surfaces, the brake pad arrangements can adopt different positions or orientations on the brake caliper.

The brake pad arrangement can be preloaded into a position in which the brake pad arrangement is supported by means of a section of the brake pad carrier plate on the brake caliper. Alternatively, the brake pad arrangement can be preloaded into a position in which it is centered in a receiving opening of the brake caliper. In this case, a predetermined spacing may be established between the brake pad arrangements and the sections of the brake caliper which surround the receiving opening. Both by means of the contact of the brake pad arrangements with the brake caliper and by means of the centered position of the brake pad arrangement in the receiving opening of the brake caliper, unwanted noise phenomena, e.g. rattling while traveling, can be avoided. With both solutions, it is also possible to prevent the impact noises which may occur as a result of the impact of the brake pad arrangement against the brake caliper during a change in the direction of travel, i.e. when changing from forward travel to reverse travel or vice versa. These impact noises can be suppressed or attenuated especially by means of the force component acting in the tangential direction.

The brake pad return device can comprise a first return unit for the first brake pad arrangement, which is designed to receive the fastening section of the brake pad carrier plate of the first brake pad arrangement and to exert a return force on the first brake pad arrangement, and a second return unit for a second brake pad arrangement, which is designed to receive the fastening section of the brake pad carrier plate of the second brake pad arrangement and to exert a return force on the second brake pad arrangement. The brake pad return device can furthermore have a fastening device for attaching the brake pad return device to a holding element of the disc brake. The fastening device can be connected to the first return unit via a first arm and to the second return unit via a second arm.

By means of the brake pad return device, the brake pad arrangements of a disc brake can be preloaded into an initial position, which they occupy when the brake is not being actuated. For this purpose, the first return unit and the second return unit can act on the fastening sections of the brake pad carrier plates of the first brake pad arrangement and of the second brake pad arrangement and exert a return force on the brake pad arrangements.

The first arm and the second arm can extend in such a way between the fastening device and the first and second return units that the first and the second return units can be preloaded into an initial position by means of the fastening device. The brake pad return device can be preloaded by means of a movement of the fastening device, wherein the movement of the fastening device is transmitted to the first and the second return unit via the first arm and the second arm. By way of example, the fastening device of the brake pad return device can be moved during installation in order to be able to fasten the brake pad return device to the brake disc and preload the return units. The arms transmit this movement of the fastening device to the return units in order to move and preload the latter into their initial position. As a result, the brake pad arrangements coupled to the return units are also preloaded into their initial position.

The first arm and the second arm can extend at a predetermined angle relative to one another. The first arm and the second arm can extend at the predetermined angle relative to one another particularly in the relaxed and uninstalled state of the brake pad return device. The predetermined angle is preferably not equal to zero.

By means of the movement of the fastening device, the brake pad return device can be transferred from the relaxed state to the preloaded state. The movement of the fastening device leads to a change in the angle between the first arm and the second arm. Since the movement of the fastening device is transferred to the return units via the arms, the return units are moved into their initial position and simultaneously preloaded. It is possible, for example, for the direction in which the fastening device is moved to be at a right angle to the direction of movement of the return units, which results from the movement of the fastening device.

The fastening device can form a middle or central section of the brake pad return device. The first return unit can be arranged at one end of the first arm. The second return unit can be arranged at one end of the second arm. The other end of each of the arms can be connected to the fastening device.

The fastening device can have at least one fastening projection, which is provided with at least one latching nose. The fastening device preferably has two fastening projections, which each have at least one latching nose. The latching noses are present at the ends of the fastening projections and are bent in the direction of the respective other fastening projection. The two fastening projections enclose between them a receiving space in which one section or one element of the disc brake can be received in order to hold the brake pad return device on the disc brake.

The first and the second return unit can each have a spring section and a receiving section for receiving a section of a brake pad carrier plate of the first or second brake pad arrangement. The spring sections of the first return unit and of the second return unit can each be connected to the first arm or the second arm. The spring sections can extend in a loop between the arm associated therewith and the receiving section of the return unit. In this case, the spring sections can extend in a loop in such a way that the receiving sections are arranged between the spring section and the fastening device. In other words, the receiving sections of the first return unit and of the second return unit can be arranged between the two spring sections and/or below the two arms.

The receiving sections of the first and the second return unit can be of substantially U-shaped design. In other words, the receiving sections of the first and of the second return device can have at least two substantially parallel sections, which are connected to one another via a section extending transversely to said sections. The at least one holding element can be formed on one of the parallel sections and it can extend obliquely away from one of the parallel sections. The holding element preferably extends obliquely in the direction of the transversely extending section from the parallel section. Starting from the transversely extending section, the guide section can extend away from the receiving section. In the relaxed state of the brake pad return device, the guide section can extend obliquely to the transversely extending section and parallel to one of the two arms.

The spring section can have at least one opening, wherein the at least one opening is used to set the stiffness of the spring section. It is also possible for the spring section to have two or more openings. By means of the at least one opening, it is possible to set a deformation limit at which the elastic deformation of the spring section changes to plastic deformation. By means of the plastic deformation of the spring section, the initial position of the brake pad arrangements which has been set by the return units can be readjusted to compensate for the wear of the brake pad. The greater the wear of the brake pad, the more the spring section is deformed when a brake pad of the brake pad arrangement comes into contact with the brake disc to perform a braking operation. By means of the readjustment of the initial position, brought about by means of the plastic deformation of the spring section, to which the brake pad arrangements are returned after a braking operation, the return force to be produced by the spring section can be held substantially constant.

The first arm and/or the second arm can each have at least one bead. The at least one bead serves to increase the stiffness of the two arms. The high stiffness of the arms makes it possible to ensure the functioning of the brake pad return device. This applies especially to the transfer of the brake pad return device from the relaxed state to the preloaded state.

BRIEF DESCRIPTION OF THE DRAWINGS

A number of embodiments of a brake pad arrangement according to the disclosure are described in detail below with reference to the appended schematic figures. In the drawings.

DETAILED DESCRIPTION

Figure 1:
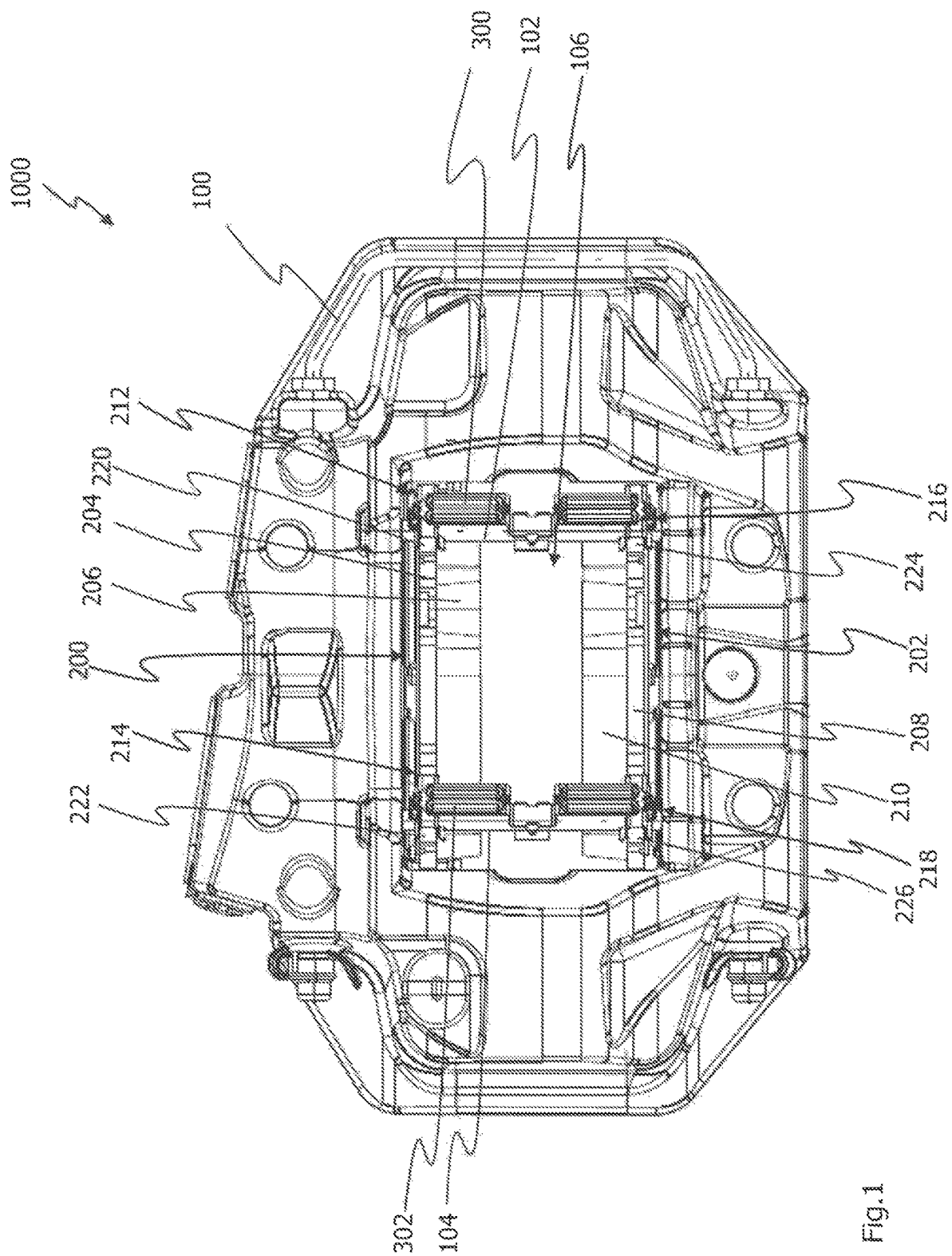
FIG. 1 shows a first view of a disc brake having brake pad arrangements according to a first embodiment of the [[invention]] disclosure.

FIG. 1 shows a plan view of a disc brake denoted overall by 1000. The disc brake 1000 has a brake caliper 100, brake pad arrangements 200, 202 and brake pad return devices 300, 302. The brake pad arrangements 200, 202 are attached to the brake caliper 100 by means of brake pad holding pins 102 and 104. The brake pad arrangements 200, 202 are accommodated at least partially in a receiving opening 106 of the brake caliper 100. The brake pad arrangements 200, 202 are preloaded by means of the brake pad return devices 300, 302 into their initial position, in which the brake pad arrangements 200, 202 are located in FIG. 1.

Brake pad arrangement 200 comprises a brake pad carrier plate 204 and a friction pad 206 attached thereto. In the same way, brake pad arrangement 202 consists of a brake pad carrier plate 208 and a friction pad 210 attached thereto. Two fastening sections 212, 214 and 216, 218 are formed in each of the brake pad carrier plates 204, 208. The brake pad return devices 300, 302 are attached to these fastening sections 212, 214, 216, 218. The brake pad return devices 300, 302 are fastened not only to the fastening sections 212, 214, 216 and 218 but also to the brake pad holding pins 102 and 104. The brake pad return devices 300, 302 thus extend between two opposite fastening sections 212, 214, 216 and 218 of the brake pad carrier plates 204 and 208 and thus span the receiving opening 106 in the brake caliper 100.

Each of the fastening sections 212, 214, 216 and 218 has a bearing surface 220, 222, 224 and 226, on which the respective brake pad return device 300, 302 can be supported. The bearing surfaces 220, 222, 224 and 226, to which the brake pad return devices 300, 302 are attached, extend obliquely or in a sloping manner, as is clearly apparent from the slope of the brake pad return devices 300, 302 in FIG. 1.

Figure 2:
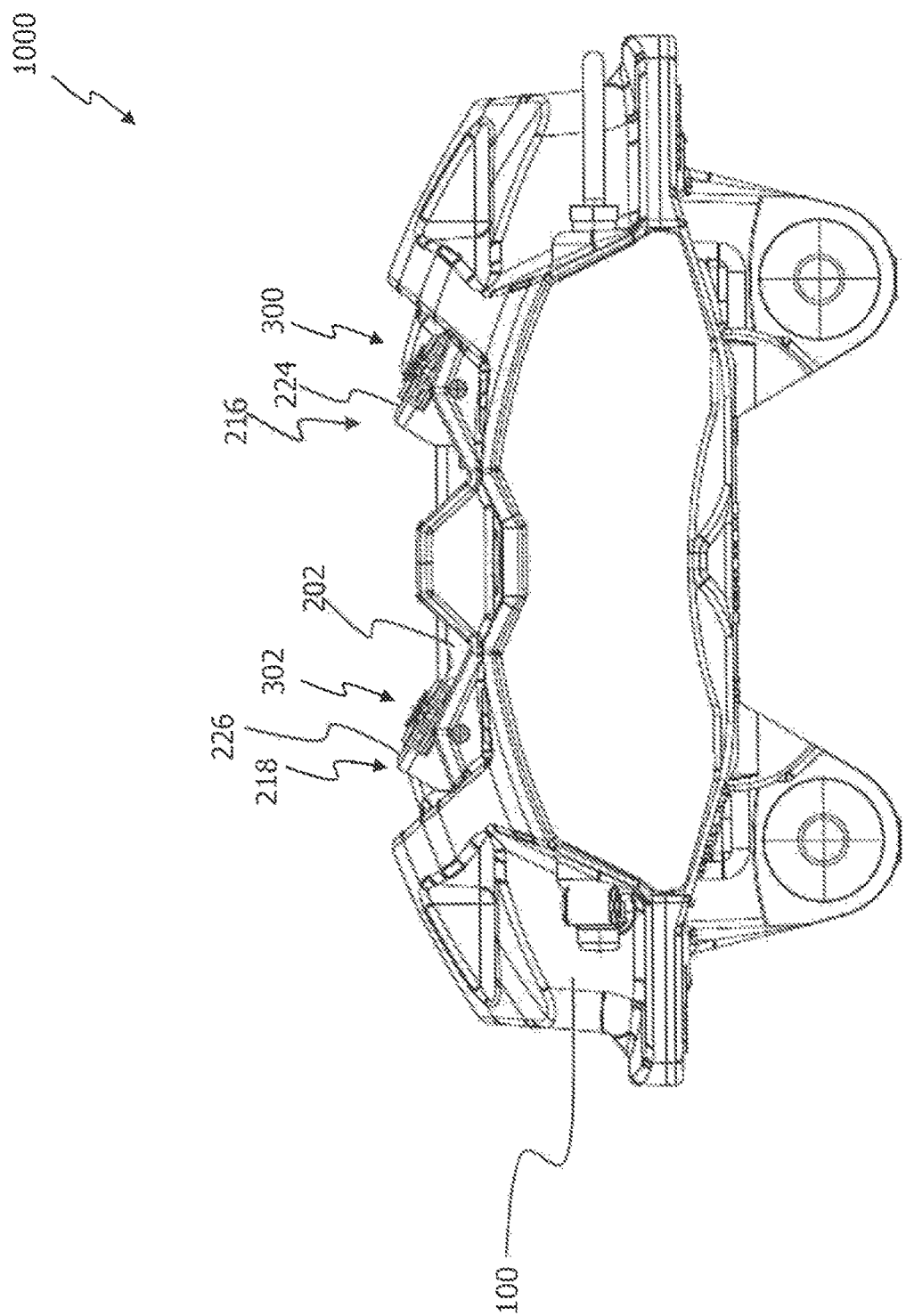
FIG. 2 shows a second view of a disc brake having brake pad arrangements according to a first embodiment of the disclosure.

FIG. 2 shows a side view of the disc brake 1000 having the brake caliper 100. The brake pad arrangement 202 is accommodated in the brake caliper 100. The brake pad arrangement 202 comprises the fastening sections 216, 218. Each of the fastening sections 216, 218 has an obliquely extending bearing surface 224, 226. A respective brake pad return device 300, 302 is attached to each of the obliquely extending bearing surfaces 224, 226.

Figure 3:
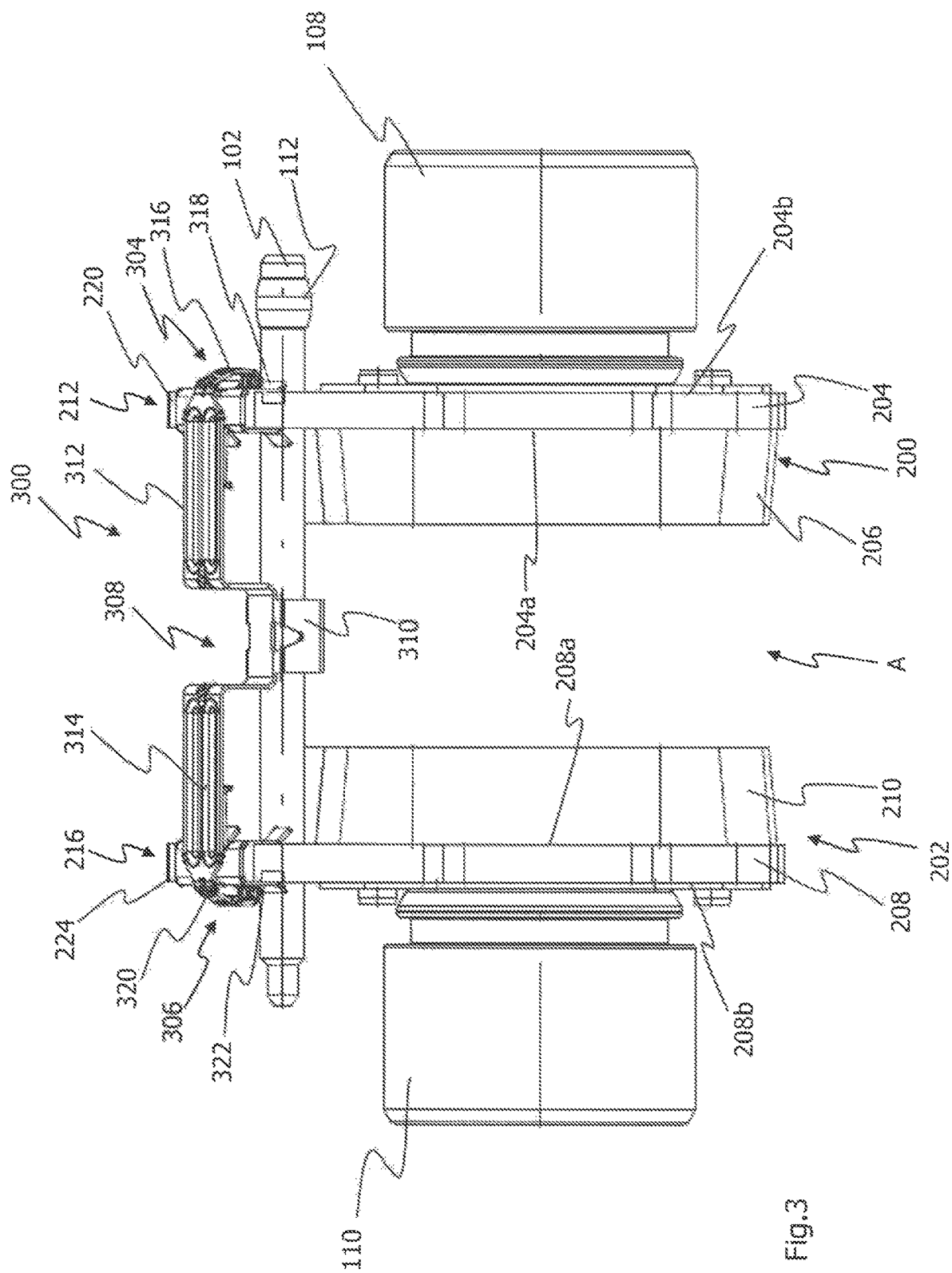
FIG. 3 shows a view of two brake pad arrangements according to the first embodiment in the state in which they are attached to a holding element and are preloaded by means of a brake pad return device.

FIG. 3 shows a view in which the brake pad arrangements 200, 202, a brake pad holding pin 102, a brake pad return device 300 and actuating pistons 108 and 110 are shown. A thickened portion 112, which serves as a stop during the insertion of the brake pad holding pin 102 into the brake caliper (see FIG. 1), can be seen on the brake pad holding pin 102. The actuating pistons 108 and 110 can move the brake pad arrangements 200, 202 toward one another in order to bring the friction pads 206, 210 into engagement with a brake disc (not shown), present in the region A, to produce a braking effect.

The brake pad return device 300 is attached to the fastening sections 212, 216 of the brake pad carrier plates 204, 208 and to the brake pad holding pin 102. The brake pad return device 300 has a first return unit 304, a second return unit 306 and a fastening device 308. The fastening device 308 has a fastening projection 310, by means of which the brake pad return device 300 is fastened to the brake pad holding pin 102. The fastening projection 310 can have a latching nose (not shown), which can engage behind the brake pad holding pin 102 to fasten the brake pad return device 300. The return units 304 and 306 are connected to the fastening device 308 by means of arms 312 and 314. Return unit 304 has a spring section 316 and the receiving section 318, which is connected to arm 312 by means of spring section 316. Return unit 306 likewise has a spring section 320 and a receiving section 322. The receiving sections 318 and 322 are of U-shaped design. By means of its receiving sections 318 and 322, the brake pad return device 300 is fastened to the fastening sections 212 and 216 of the brake pad carrier plates 200, 202.

The receiving sections 318 and 320 of the brake pad return device 300 are supported on the bearing surfaces 220 and 224 of the fastening sections 212, 216. The bearing surfaces 220, 224 are of oblique or sloping design, as can be seen inter alia from the sloping extent of the brake pad return device 300. Bearing surface 220 extends between face 204a, to which friction pad 208 is attached, and the rear face 204b of brake pad carrier plate 204. Bearing surface 224 extends between face 208b, to which friction pad 210 is attached, and the rear face 208a of brake pad carrier plate 208. The bearing surfaces 220 and 224 thus extend over the entire thickness of the brake pad carrier plates 204 and 208 and substantially perpendicularly to the faces 204a and 208a of the brake pad carrier plates 204 and 208 to which the friction pads 206 and 210 are attached. The bearing surfaces 220 and 224 also extend substantially perpendicularly to the rear faces 204b and 208b of the brake pad carrier plates 204 and 208 and form a contoured edge of the brake pad carrier plates 204 and 208. The above embodiments apply analogously also to the bearing surfaces 222 and 226 of the fastening sections 214 and 218, but these are not shown in FIG. 3.

Figure 4:
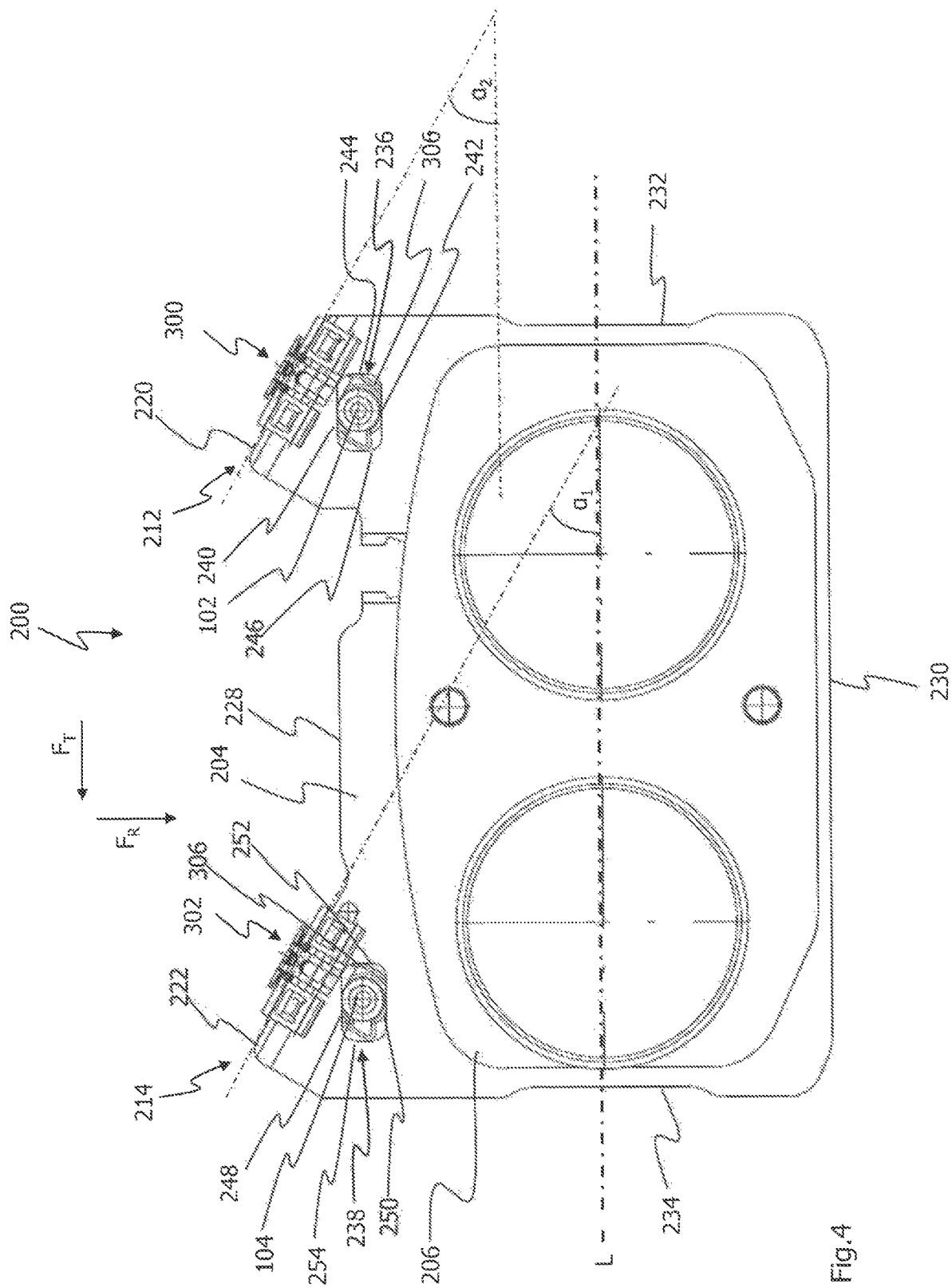
FIG. 4 shows a front view of the brake pad arrangement according to the first embodiment.
Figure 5:
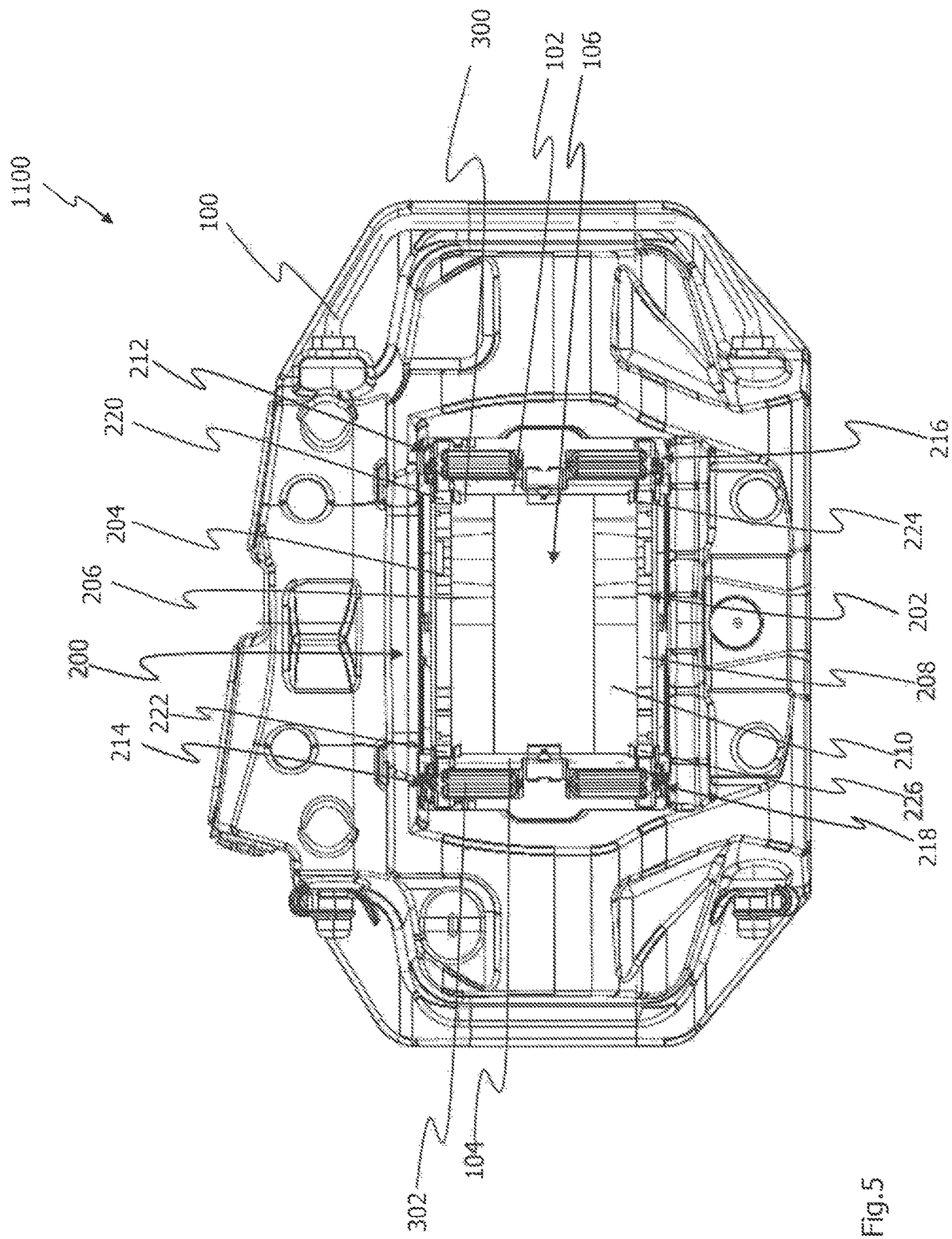
FIG. 5 shows a first view of a disc brake having brake pad arrangements according to a second embodiment of the disclosure.
Figure 6:
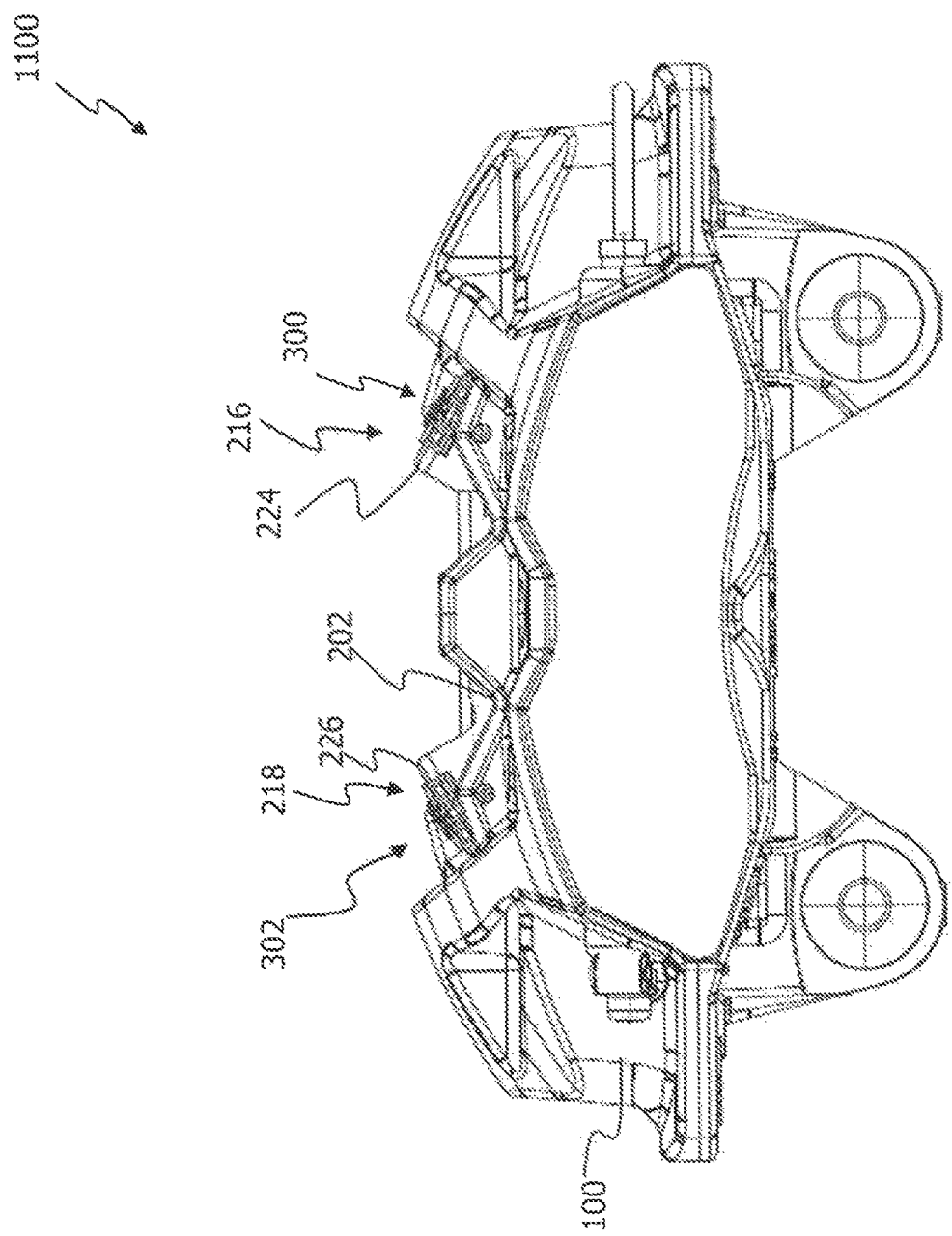
FIG. 6 shows a second view of a disc brake having brake pad arrangements according to a second embodiment of the disclosure.
Figure 7:
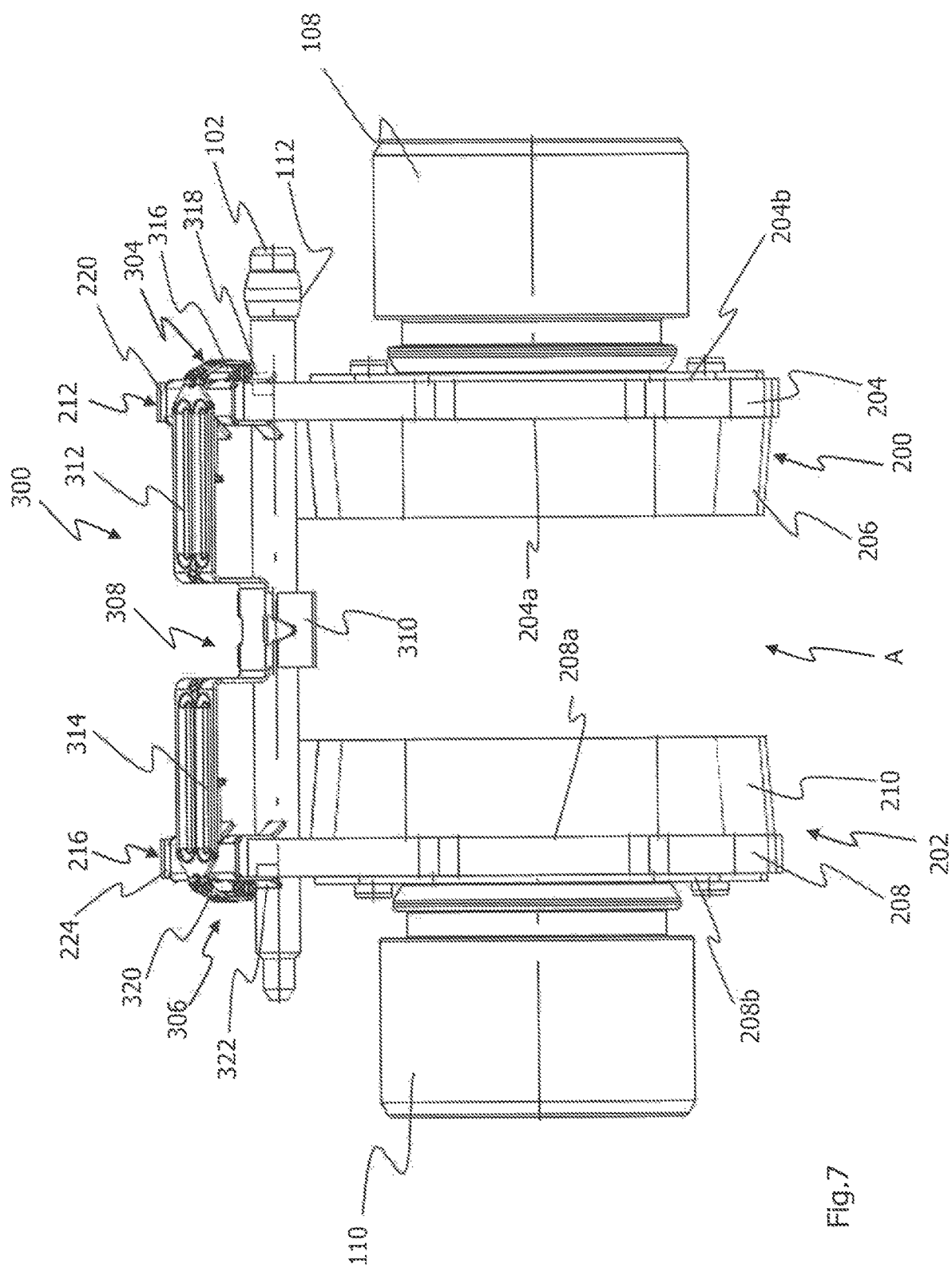
FIG. 7 shows a view of two brake pad arrangements according to the second embodiment in the state in which they are attached to a holding element and are preloaded by means of a brake pad return device.

FIG. 4 shows a front view of the brake pad arrangement 200. Brake pad arrangement 202 is of identical design to brake pad arrangement 200, and therefore the following statements apply analogously also to brake pad arrangement 202.

Brake pad arrangement 200 comprises brake pad carrier plate 204 and the friction pad 206 attached thereto and has essentially four main contoured edges 228, 230, 232 and 234, which determine the shape of brake pad carrier plate 204. Contoured edges 228 and 230 extend substantially parallel to one another and parallel to the longitudinal axis L of brake pad carrier plate 204. Contoured edges 232 and 234 extend transversely to the longitudinal axis L. Formed on the contoured edge 228 extending parallel to the longitudinal axis L are the fastening sections 212 and 214, to which the brake pad return devices 300, 302 are fastened. The fastening sections 212 and 214 project from the contoured edge 228 in a direction transverse to the longitudinal axis L of the brake pad carrier plate 204. In FIG. 4, the fastening sections 212 and 214 are arranged in a direction transverse to the longitudinal axis L above the friction pad 206.

Each of the fastening sections 212 and 214 has a bearing surface 220 and 222, on which the respective brake pad return devices 300, 302 can be supported. The bearing surfaces 220 and 222 extend at a predetermined angle $\alpha_1$ and $\alpha_2$ obliquely to the longitudinal axis L, as illustrated schematically in FIG. 4. For illustration, the angles $\alpha_1$ and $\alpha_2$ in FIG. 4 are each formed between an imaginary extension of the bearing surfaces 220 and 222 and of the longitudinal axis L or an imaginary line extending parallel to the longitudinal axis L. The angles $\alpha_1$ and $\alpha_2$ can each be 30°, for example. The bearing surfaces 220 and 222 extend parallel to one another and obliquely with respect to the longitudinal axis L of brake pad carrier plate 204.

Brake pad carrier plate 204 has two oblong openings 236 and 238, through which the brake pad holding pins 102, 104 extend. The oblong opening 236 has two edges 240 and 242, which extend at least substantially parallel to one another and are connected to one another by edges 244 and 246. Edges 244 and 246 likewise extend at least substantially parallel to one another. Edges 240 and 242 extend parallel to the longitudinal axis L of the brake pad carrier plate 204 and the length of said edges defines the maximum extent of the oblong opening 236. Edges 244 and 246 are shorter than edges 240 and 242. Oblong opening 238 is of identical design to oblong opening 236 and likewise has four edges 248, 250, 252, 254, wherein edges 248 and 250 extend at least substantially parallel to the longitudinal axis L. Opening 236 is associated with fastening section 212, and fastening opening 238 is associated with fastening section 214. The fastening sections 306 of the brake pad return devices 300, 302 with their fastening projections 310 (see FIG. 3), which hold the brake pad return devices 300, 302 on the brake pad holding pins 102 and 104, can be seen within the openings 236 and 238.

By means of the bearing surfaces 220 and 222 extending obliquely to the longitudinal axis L, the preloading force produced by the brake pad return devices 300, 302 can be divided into essentially two force components. One of the two force components acts in the direction of the longitudinal axis L and is designated by FT below. The other of the two force components acts in a direction transverse to the longitudinal axis L and is designated by FR. In the state of the disc brake 1000 in which it is attached to the vehicle, the force component FT acts tangentially in relation to the associated wheel axle or the brake disc attached to the wheel axle (not shown). In contrast, the force component FR acts in the radial direction in relation to the associated wheel axle (not shown). The two force components FR and FT preload the brake pad arrangement 200 into a predetermined position and/or orientation on the brake caliper (see FIGS. 1 and 2). Force component FT preloads the brake pad arrangement 200 into a position in which the brake pad carrier plate 204 is in contact with the brake caliper (see FIGS. 1 and 2). For example, the brake pad carrier plate 204 can be supported by its contoured edge 234, on the left in FIG. 4, on the brake caliper (see FIG. 1).

By virtue of the division of the preloading force provided by the brake pad return devices 300, 302, which results from the obliquely extending bearing surfaces 220 and 222, unwanted noise phenomena can be prevented. By means of the force component FR acting in the radial direction, it is possible, in particular, to attenuate or suppress rattling noises in the case of an uneven roadway during the operation of the vehicle. The tangential force component FT prevents, in particular, impact noises when changing the direction of travel, i.e. when changing between forward travel and reverse travel, since this force component counteracts a movement of the brake pad arrangement 200 away from contact with the brake caliper (see FIGS. 1 and 2) and can thereby prevent or attenuate a noise-generating impact on some other section of the brake caliper.

FIGS. 5 to 8 show a disc brake 1100 on which a brake pad arrangement 200 according to a second embodiment is used. The essential differences between the first embodiment described with reference to FIGS. 1 to 4 and the second embodiment shown in FIGS. 5 to 8 lie in the fastening sections 212, 214, 216, 218 and the bearing surfaces 220, 222, 224 and 226 thereof.

In the second embodiment, the bearing surfaces 220, 222, 224 and 226 likewise extend obliquely to the longitudinal axis L of the brake pad carrier plates 204 and 208. As can be seen especially in FIGS. 6 and 8, the bearing surfaces 220 and 222 of fastening sections 212 and 214 slope in opposite directions, however. The same applies to the bearing surfaces 224 and 226 of fastening sections 216 and 218 of brake pad carrier plate 208. The brake pad arrangement 200 illustrated in FIG. 8 is described in greater detail below, wherein the statements also apply analogously to brake pad arrangement 202.

Figure 8:
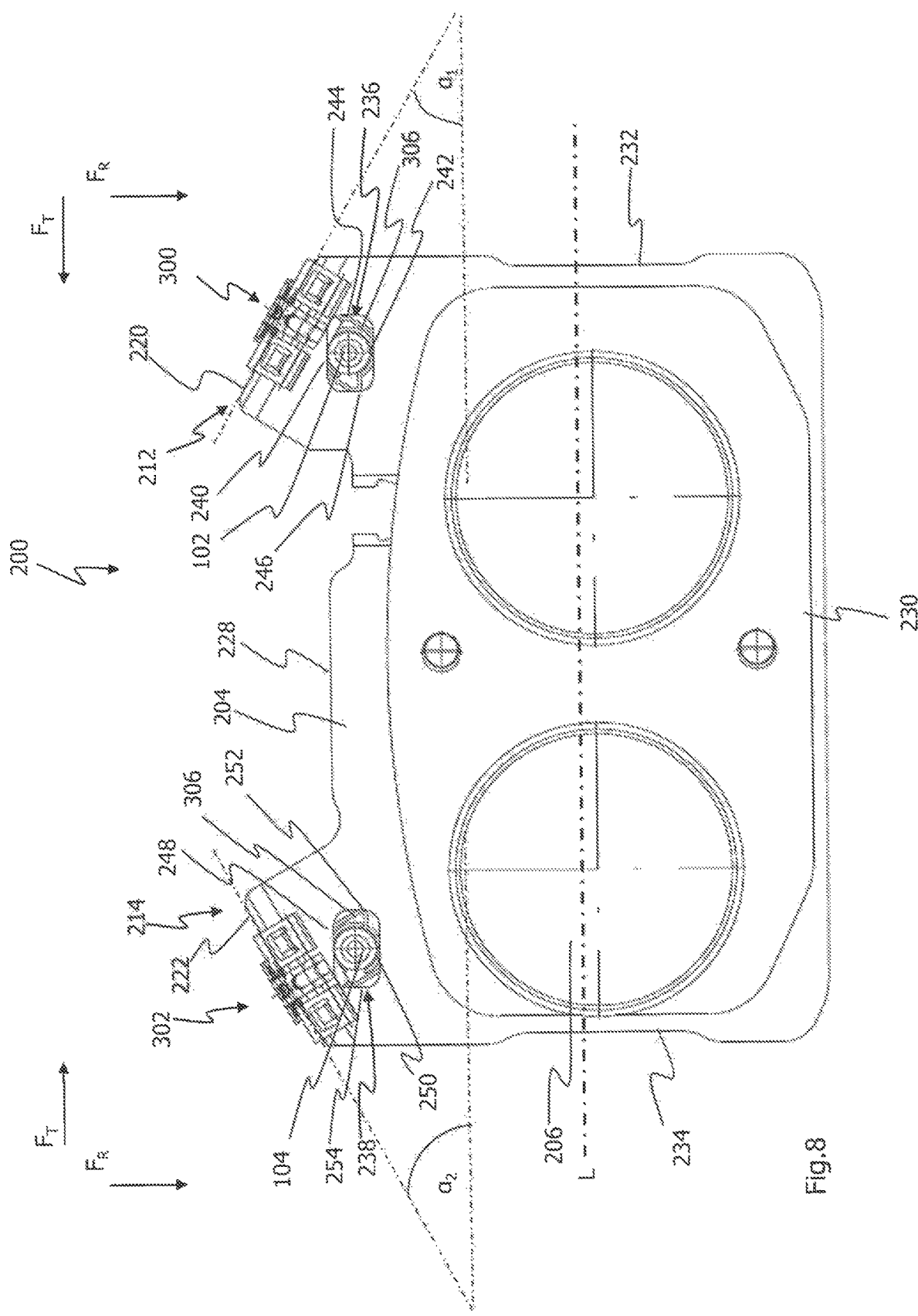
FIG. 8 shows a front view of the brake pad arrangement according to the second embodiment.
Figure 9:
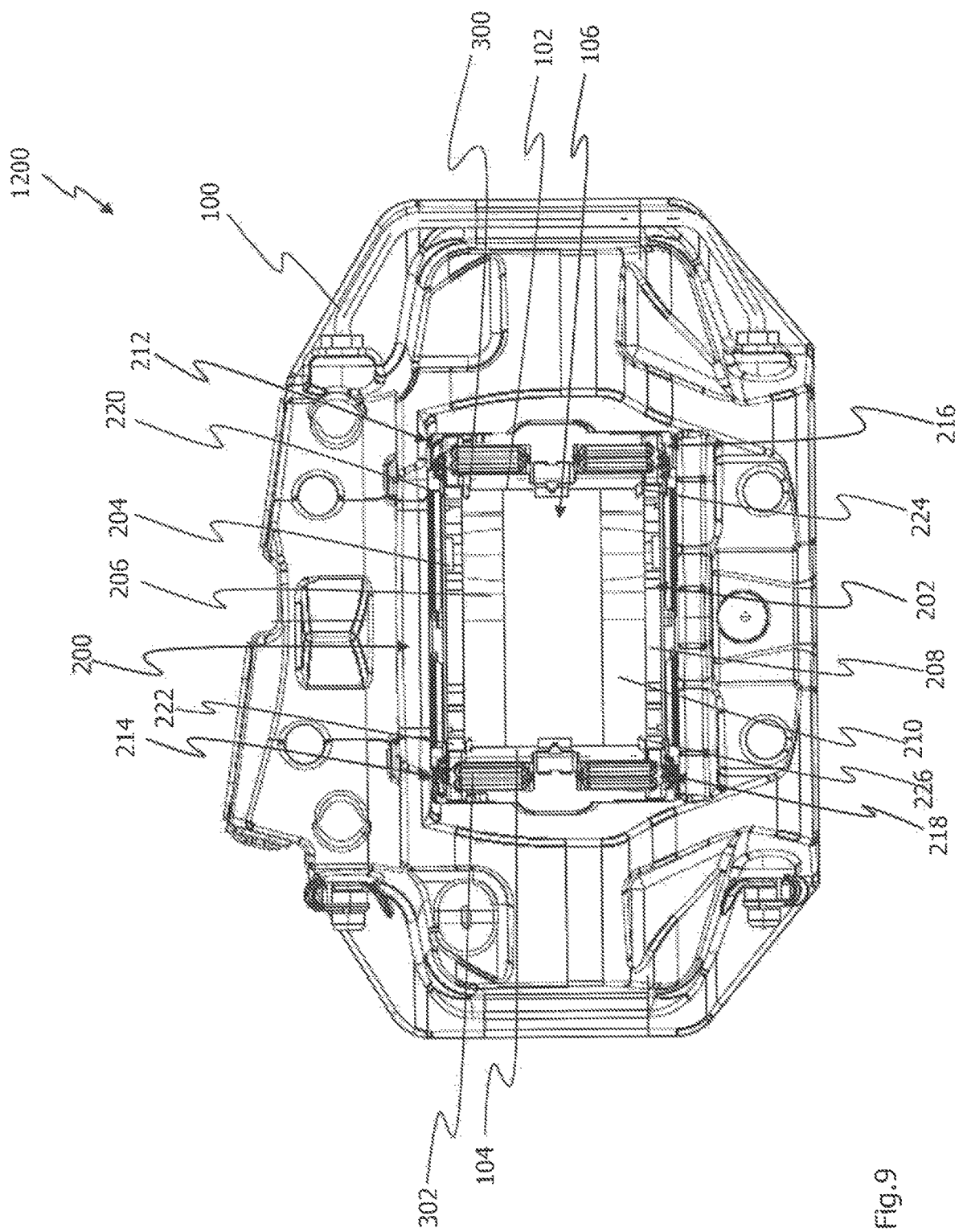
FIG. 9 shows a first view of a disc brake having brake pad arrangements according to a third embodiment of the [[invention]] disclosure.
Figure 10:
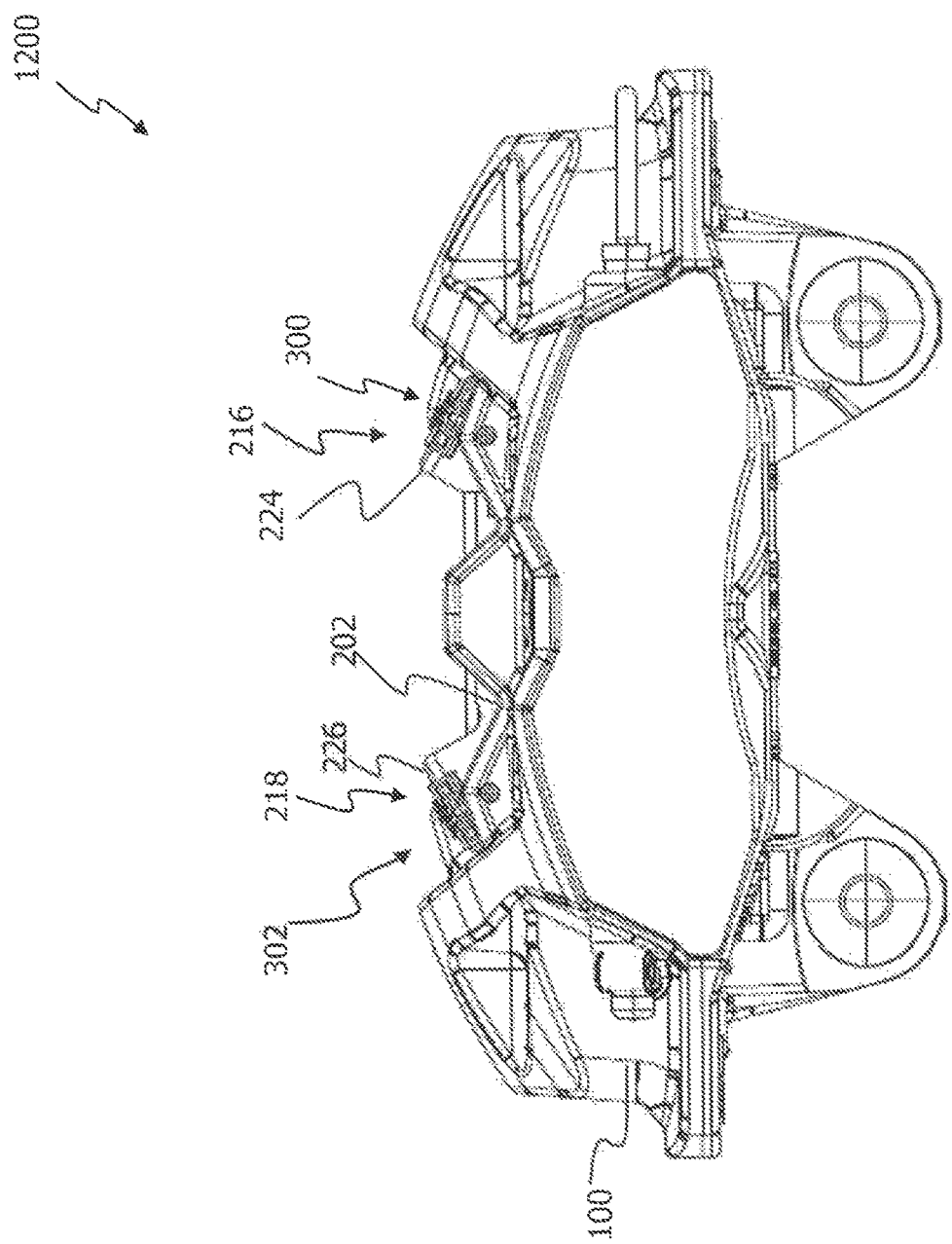
FIG. 10 shows a second view of a disc brake having brake pad arrangements according to a third embodiment of the disclosure.
Figure 11:
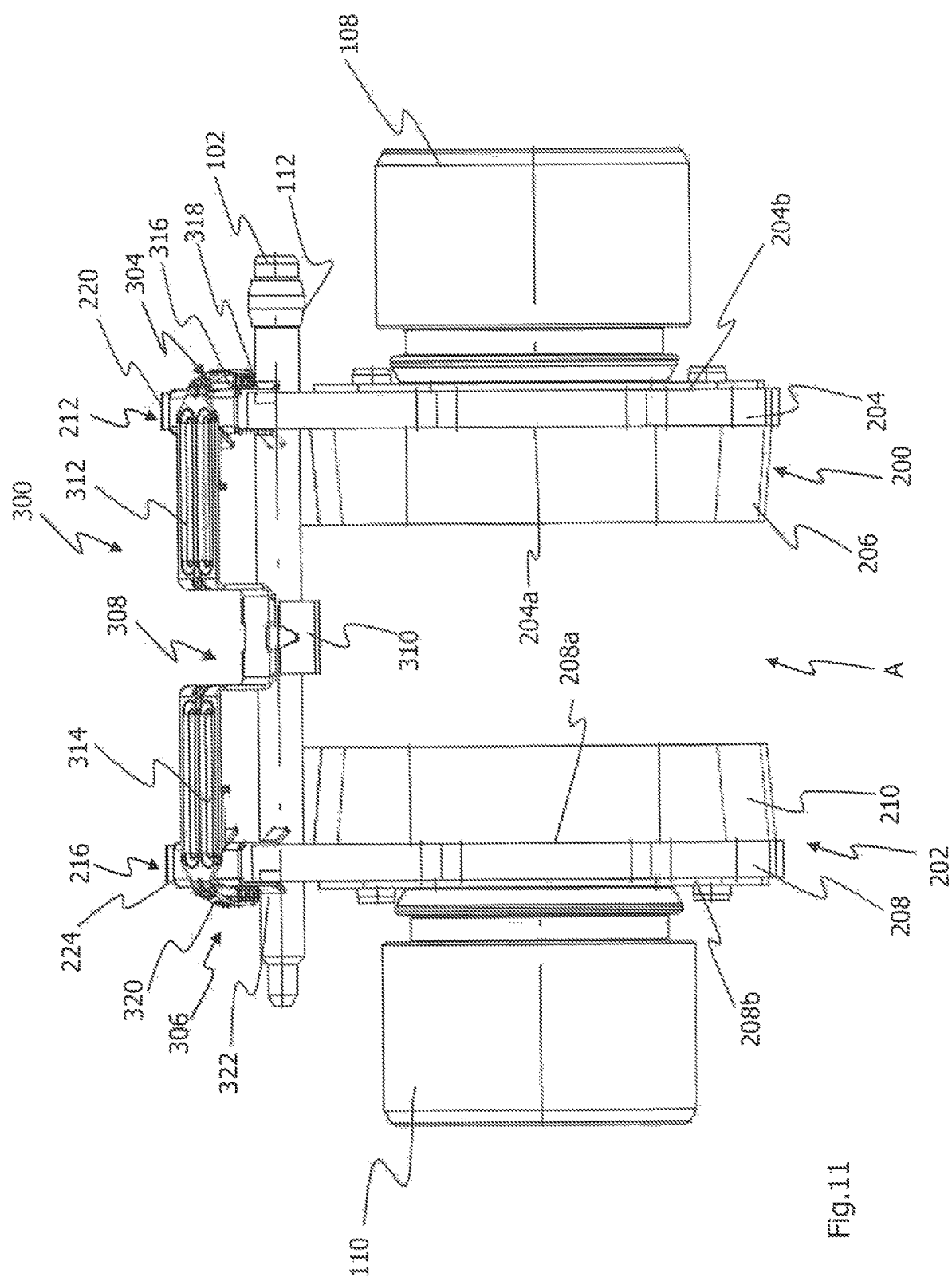
FIG. 11 shows a view of two brake pad arrangements according to the third embodiment in the state in which they are attached to a holding element and are preloaded by means of a brake pad return device.
Figure 12:
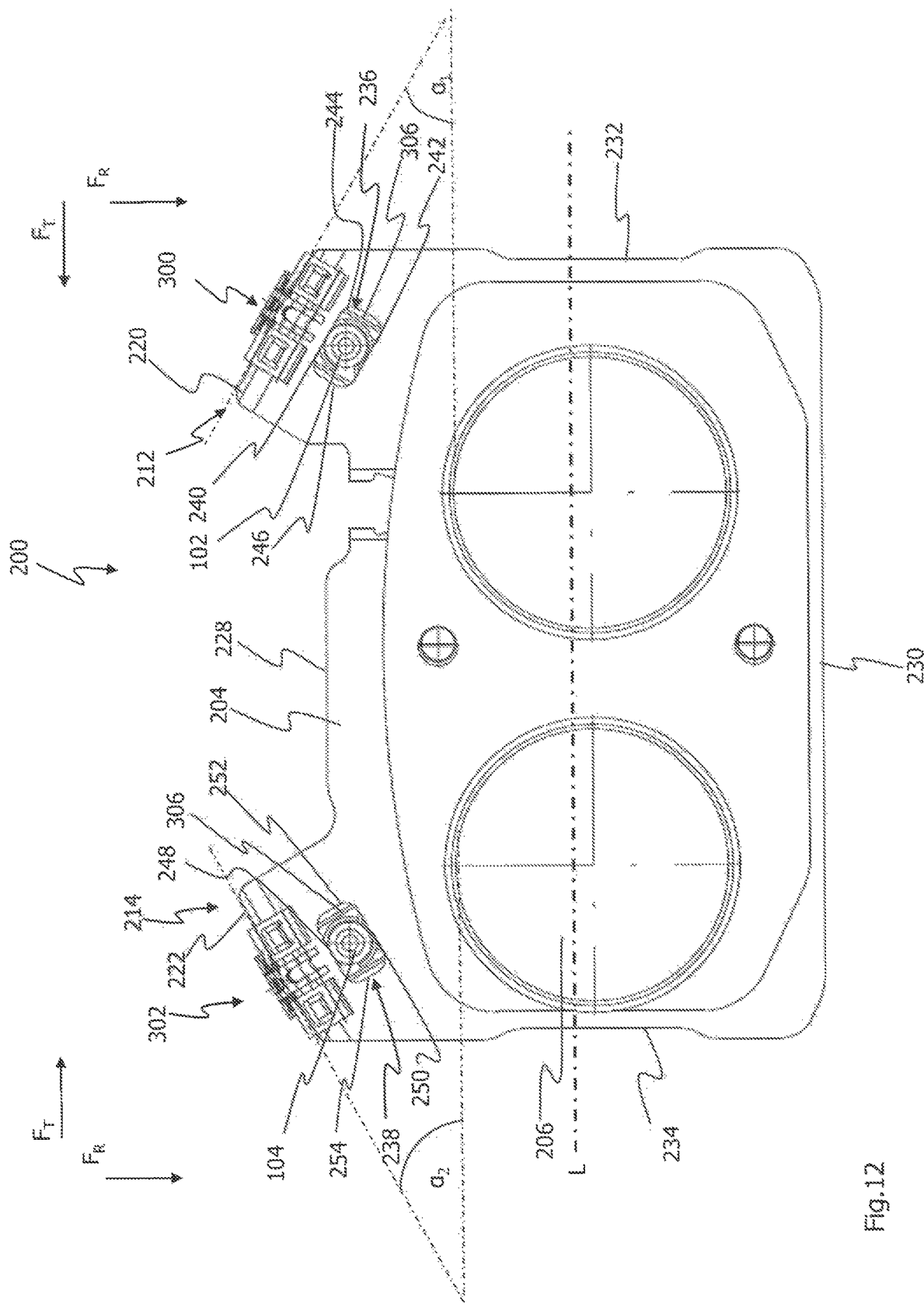
FIG. 12 shows a front view of the brake pad arrangement according to the third embodiment.

As shown in FIG. 8, the bearing surfaces 220 and 222 of the fastening sections 212 and 214 slope in opposite directions, i.e. the bearing surfaces are not parallel to one another. The bearing surfaces 220 and 222 extend at a predetermined angle $\alpha_1$ and $\alpha_2$ to the longitudinal axis L. To illustrate the angles $\alpha_1$ and $\alpha_2$, these angles have been depicted between an extension of the bearing surfaces 220 and 222 and an imaginary line parallel to the longitudinal axis L. Owing to the opposite slope of the bearing surfaces 220 and 222, the angles $\alpha_1$ and $\alpha_2$ open in opposite directions. The brake pad return devices 300 and 302 are fastened to the fastening sections 220 and 222. The brake pad return devices 300 and 302 are supported on the bearing surfaces 220 and 222. The bearing surfaces 220 and 222 form a contoured edge of the brake pad carrier plate 204. The bearing surfaces 220 and 222 extend over the entire thickness of the brake pad carrier plate 204.

By virtue of the bearing surfaces 220 and 222 extending obliquely with respect to the longitudinal axis L, the brake pad return devices 300 and 302 are likewise attached obliquely to the brake pad carrier plate. By means of the obliquely extending bearing surfaces 220 and 222, the preloading force provided by the brake pad return devices 300 and 302 can be divided into a tangential force component FT and a radial force component FR. The tangential force components FT provided by the brake pad return devices 300 and 302 act in opposite directions along the longitudinal axis L. By means of the tangential force components FT acting in opposite directions or directed toward one another and by means of the radial force components FR of the brake pad return devices 300 and 302, the brake pad arrangements 200 and 202 are centered in the receiving opening of the brake caliper (see FIG. 5). As a result, a predetermined spacing can be established between the brake pad arrangements 200 and 202 and the surrounding sections of the brake caliper (see FIG. 5). This predetermined spacing can be established, in particular, between the contoured edges 232 and 234 on the left and right in FIG. 8 and those sections of the receiving opening of the brake caliper which lie opposite said contoured edges (see FIG. 5). By means of the oppositely sloping bearing surfaces 220 and 222, it is possible to suppress rattling noises, which occur especially on an uneven roadway. However, the impact noises that arise when the direction of travel changes are also attenuated.

FIGS. 9 to 12 show a disc brake 1200 having brake pad arrangements 200 and 202 according to a third embodiment. The third embodiment is based on the second embodiment described above with reference to FIGS. 5 to 7. The essential differences between the second embodiment and the third embodiment described below lie in the extent of the oblong openings 236 and 238 through which the brake pad holding pins 102 and 106 extend.

The oblong openings 236 and 238 extend obliquely with respect to the longitudinal axis L of the brake pad carrier plate 204 (see FIG. 12) but parallel to the bearing surfaces 220 and 222, which in turn extend obliquely with respect to the longitudinal axis L. In particular, the openings 236 and 238 have two mutually parallel edges 240, 242 and 248, 250, which determine the maximum extent of the oblong openings 236 and 238. The edges 240, 242 and 248, 250 extend obliquely at a predetermined angle with respect to the longitudinal axis L. This predetermined angle can be 30°, for example. The edges 240, 242 and 248, 250 extend parallel to the bearing surfaces 220 and 222. The brake pad return devices 300 and 302 attached to the bearing surfaces 220 and 222 each produce a tangential force component FT and a radial force component FR. The tangential force components FT of the two brake pad return devices 300 and 302 are directed toward one another. The brake pad arrangements 200, 202 can be preloaded into a centered position in the receiving opening of the brake caliper, i.e. the brake pad arrangements 200 and 202 have a predetermined spacing with respect to the surrounding sections of the brake caliper (see FIG. 9).

By virtue of the obliquely extending stop surfaces 220 and 222 and the likewise obliquely extending oblong openings 236 and 238, the brake pad arrangements can move in the receiving opening of the brake caliper counter to the preloading force of the brake pad return devices 300 and 302 or counter to the force components FT and FR produced by the brake pad return devices 300 and 302. The brake pad arrangements 200 and 202 can thus perform a "rocking motion" in the receiving opening of the brake caliper in the case of a tangential load acting thereon and/or in the case of loads occurring in the vertical direction. As a result, the brake pad arrangement 200, 202 can no longer strike the brake caliper over an extended area but, instead, can "roll" by means of one of the contoured edges 230, 232 and 234 on the brake caliper sections lying opposite said contoured edges, for example. As a result, the rattling noises which arise in the case of an uneven roadway and also the impact noises which arise when the direction of travel changes, i.e. the impact noises which arise when changing from forward travel to reverse travel or vice versa, are attenuated or suppressed.

The invention claimed is:

1. A brake pad arrangement for a disc brake of a vehicle braking system, having:
   at least one brake pad carrier plate and
   at least one friction pad, which is attached to the at least one brake pad carrier plate,
   wherein the brake pad carrier plate has first and second fastening sections, which are designed for fastening at least one brake pad return device,
   wherein each of the first and second fastening sections has at least one substantially flat bearing surface for an associated brake pad return device, and each of the-bearing surfaces extends obliquely, with respect to a longitudinal axis of the brake pad carrier plate, from a first longitudinal end of the bearing surface to a second longitudinal end of the bearing surface such that the first longitudinal end is spaced further in a radial direction from the longitudinal axis than the second longitudinal end, the radial direction being perpendicular to the longitudinal axis, the at least one bearing surface of the first fastening section and the at least one bearing surface of the second fastening section extending in parallel to one another.

2. The brake pad arrangement as claimed in claim 1, wherein the brake pad carrier plate has at least one oblong opening, which is designed to receive a holding element for the brake pad arrangement.

3. The brake pad arrangement as claimed in claim 2, wherein the at least one oblong opening extends parallel or obliquely with respect to the longitudinal axis of the brake pad carrier plate.

4. The brake pad arrangement as claimed in claim 2, wherein the at least one oblong opening extends parallel to at least one of the bearing surfaces.

5. The brake pad arrangement as claimed in claim 4, wherein the first and second fastening sections are formed on a contoured edge extending at least substantially parallel to the longitudinal axis of the brake pad carrier plate.

6. The brake pad arrangement as claimed in claim 5, wherein at least one of the bearing surfaces extends at least substantially at a right angle to a face of the brake pad carrier plate to which the friction pad is attached.

7. A disc brake, having:
   a brake caliper,
   a first brake pad arrangement and a second brake pad arrangement as claimed in claim 1,
   at least one holding element, on which the first brake pad arrangement and the second brake pad arrangement are suspended, and
   at least one brake pad return device, wherein the at least one brake pad return device is attached to the at least one holding element and in each case to at least one fastening section of the brake pad carrier plates of the first brake pad arrangement and of the second brake pad arrangement, wherein the at least one brake pad return device preloads the first brake pad arrangement and the second brake pad arrangement into an initial position.

8. A disc brake of a vehicle braking system, the disc brake comprising:
   a first brake pad carrier plate having a first fastening section, the first fastening section having a bearing surface that extends obliquely with respect to a longitudinal axis of the first brake pad carrier plate;
   a second brake pad carrier plate having a second fastening section, the second fastening section having a bearing surface that extends obliquely with respect to a longitudinal axis of the second brake pad carrier plate;
   the first brake pad carrier plate having a third fastening section, the third fastening section having a bearing surface that extends obliquely with respect to the longitudinal axis of the first brake pad carrier plate;
   the second brake pad carrier plate having a fourth fastening section, the fourth fastening section having a bearing surface that extends obliquely with respect to the longitudinal axis of the second brake pad carrier plate;
   at least one friction pad attached to the first brake pad carrier plate;
   at least one friction pad attached to the second brake pad carrier plate;
   a first holding pin extending through first openings in each of the first and second brake pad carrier plates, the first holding pin being adjacent the first and second fastening sections;
   a first brake pad return device including a first fastening device, a first return unit having a first receiving section and a second return unit having a second receiving section, the first fastening device having a first projection via which the first brake pad return device is directly fastened to the first holding pin, the first and second return units being connected to opposing sides of the first fastening device, the first receiving section being directly supported on the bearing surface of the first fastening section and the second receiving section being directly supported on the bearing surface of the second fastening section such that the first brake pad return device is fastened to the first and second fastening sections via the first and second receiving sections;

a second holding pin extending through second openings in each of the first and second brake pad carrier plates, the second holding pin being spaced from the first holding pin and adjacent the third and fourth fastening sections; and a second brake pad return device structurally separate and spaced from the first brake pad return device, the second brake pad return device including a second fastening device, a third return unit having a third receiving section and a fourth return unit having a fourth receiving section, the second fastening device having a second projection via which the second brake pad return device is fastened to the second holding pin, the third and fourth return units being connected to opposing sides of the second fastening device, the third receiving section being supported on the bearing surface of the third fastening section and the fourth receiving section being supported on the bearing surface of the fourth fastening section such that the second brake pad return device is fastened to the third and fourth fastening sections via the third and fourth receiving sections.

9. The disc brake of a vehicle braking system as claimed in claim 8,
wherein the first and second return units are directly connected to the opposing sides of the first fastening device by first and second arms, the first return unit having a first spring section that connects the first receiving section to the first arm, the second return unit having a second spring section that connects the second receiving section to the second arm.

10. The disc brake of a vehicle braking system as claimed in claim 9,
wherein the first spring section extends in a curved manner between the first receiving section and the first arm and the second spring section extends in curved manner between the second receiving section and the second arm such that the first and second receiving sections are between the first and second spring sections.

11. The disc brake of a vehicle braking system as claimed in claim 10,
wherein the bearing surface of the first fastening section and the bearing surface of the third fastening section slope in opposite directions.

12. The disc brake of a vehicle braking system as claimed in claim 10,
wherein the first brake pad carrier plate has two oblong openings, each oblong opening being configured to receive an associated holding pin for the brake pad arrangement.

13. The disc brake of a vehicle braking system as claimed in claim 12,
wherein each oblong opening extends parallel or obliquely with respect to the longitudinal axis of the first brake pad carrier plate.

14. The disc brake of a vehicle braking system as claimed in claim 12,
wherein each oblong opening extends parallel to an associated one of the first and third bearing surfaces.

15. The disc brake of a vehicle braking system as claimed in claim 10,
wherein each of the first and third fastening sections is formed on a contoured edge extending at least substantially parallel to the longitudinal axis of the first brake pad carrier plate.

16. The disc brake of a vehicle braking system as claimed in claim 10,
wherein each bearing surface extends at least substantially at a right angle to a face of the brake pad carrier plate to which the friction pad is attached.

17. The disc brake of a vehicle braking system as claimed in claim 10 having:
a brake caliper,
wherein the first brake pad return device preloads the first brake pad carrier plate and the second brake pad carrier plate into an initial position relative to the brake caliper.

18. The disc brake of a vehicle braking system as claimed in claim 8, wherein the first and third bearing surfaces extend from a first longitudinal end of the bearing surface to a second longitudinal end of the bearing surface such that the first longitudinal end is spaced further in a radial direction from a longitudinal axis of the first brake pad carrier plate than the second longitudinal end, the radial direction being perpendicular to the longitudinal axis, the first longitudinal ends of the first and third bearing surfaces being longitudinally closer to a central radial axis of the first brake pad carrier plate than the second longitudinal ends of the bearing surfaces, the central radial axis intersecting the longitudinal axis at a longitudinal center point of the first brake pad carrier plate.

19. The disc brake of a vehicle braking system as claimed in claim 18,
wherein the first brake pad carrier plate has longitudinally opposite first and second contoured edges, the second longitudinal end of the first bearing surface of the first fastening section being at the first contoured edge, the second longitudinal end of the bearing surface of the third fastening section being at the second contoured edge, the first longitudinal ends of the bearing surfaces being spaced longitudinally from each of the first and second contoured edges.

* * * * *